United States Patent [19]

Saito

[11] Patent Number: 5,204,706

[45] Date of Patent: Apr. 20, 1993

[54] MOVING PICTURE MANAGING DEVICE

[75] Inventor: Akira Saito, Tokyo, Japan

[73] Assignee: Kabushiki Kaisha Toshiba, Kawasaki, Japan

[21] Appl. No.: 797,951

[22] Filed: Nov. 26, 1991

[30] Foreign Application Priority Data

Nov. 30, 1990 [JP] Japan .................................. 2-340316

[51] Int. Cl.$^5$ .............................................. G03B 21/00
[52] U.S. Cl. ..................................... 352/129; 352/123
[58] Field of Search ................. 352/129, 123; 358/311, 358/312

[56] References Cited

U.S. PATENT DOCUMENTS

| | | | |
|---|---|---|---|
| 3,772,465 | 11/1973 | Vlahos et al. | 352/38 |
| 4,501,478 | 2/1985 | Mattes | 352/129 |
| 5,050,984 | 9/1991 | Geshwind | 352/129 |
| 5,083,860 | 1/1992 | Miyatake et al. | 352/129 |

FOREIGN PATENT DOCUMENTS 2189037 10/1987 United Kingdom .

OTHER PUBLICATIONS

"Implementation of the Code using Datacode ® Magnetic Control Surface Film" by Compton and Dimitri, *SMPTE Journal*, Jul. 1986, pp. 727–732.

"EPS 70 and ECC 70 Editing Systems" by Dieter Geise *International Broadcast Engineer*, Sep. 1978, pp. 62–72.

"TR-800: A Totally New 1-Inch VTR with System-Compatible Components for Complete Versatility", *RCA Broadcast News*, vol. 168, Jun. 1980, pp. 18–21.

"The Use of Microcomputers and Microprocessors in modern VTR Control", *SMPTE Journal*, vol. 88, Dec. 1979, pp. 831–834.

H. Tamura et al., "Image Database Systems: A Survey", Pattern Recognition, 1984, pp. 29–43.

*Primary Examiner*—Monroe H. Hayes
*Attorney, Agent, or Firm*—Cushman, Darby & Cushman

[57] ABSTRACT

In a moving picture managing device, a boundary sensor senses the boundary between a cut of the input moving picture consisting of a plurality of frames and another cut on the basis of the difference in the number of blocks at the time of encoding the moving picture for a frame between the frame and an adjacent frame. Based on the boundaries sensed at the boundary sensor, the moving picture is filed in cuts. The moving picture is processed so as to be stored in a memory in a tree structure fashion in which the moving picture is composed of scenes and a plurality of cuts, each scene consisting of cuts. The filing is managed in cuts under the tree structure.

10 Claims, 8 Drawing Sheets

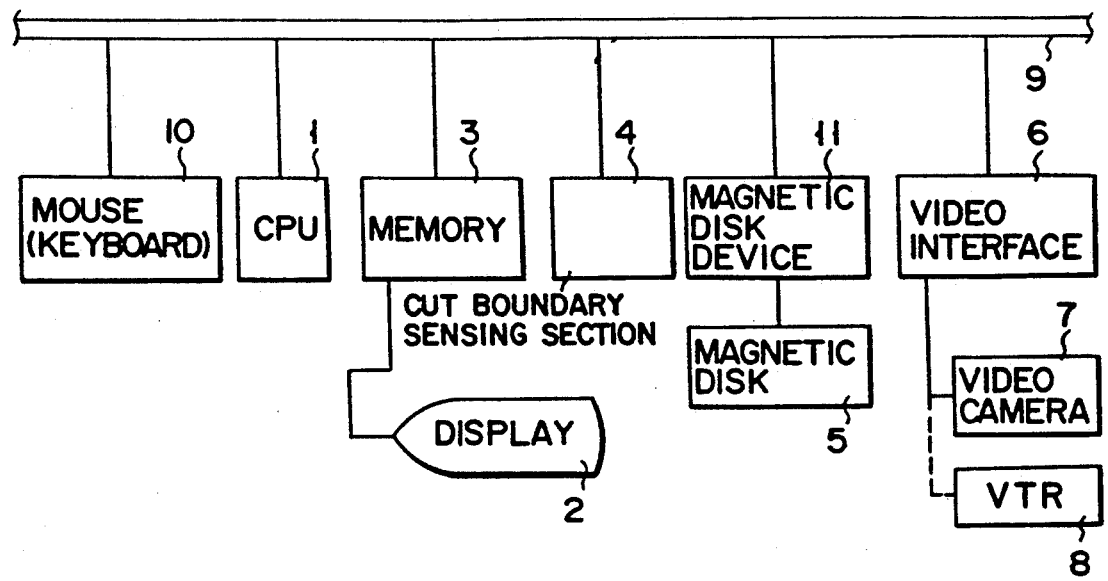
F I G. 1
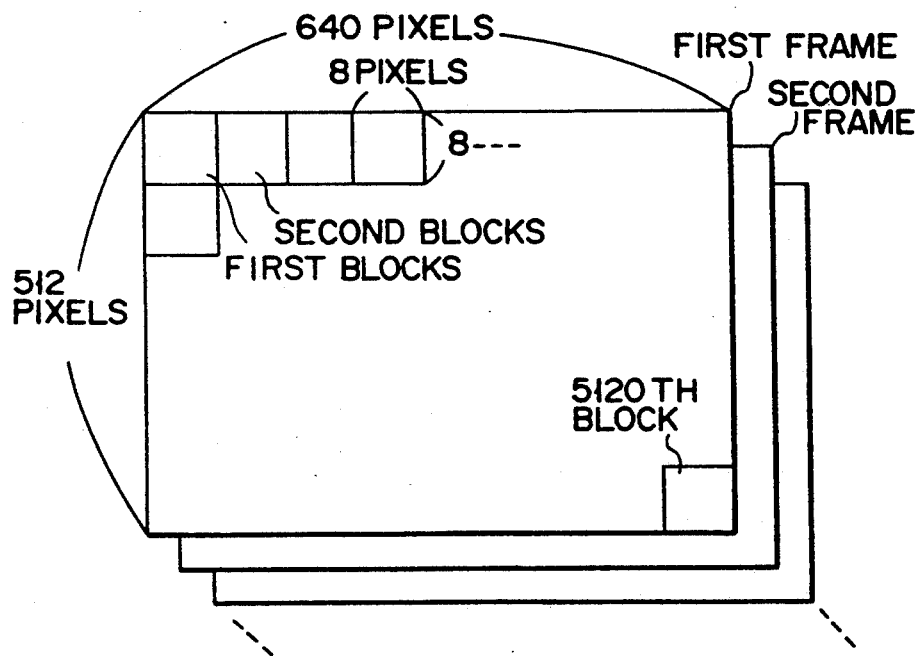
F I G. 2

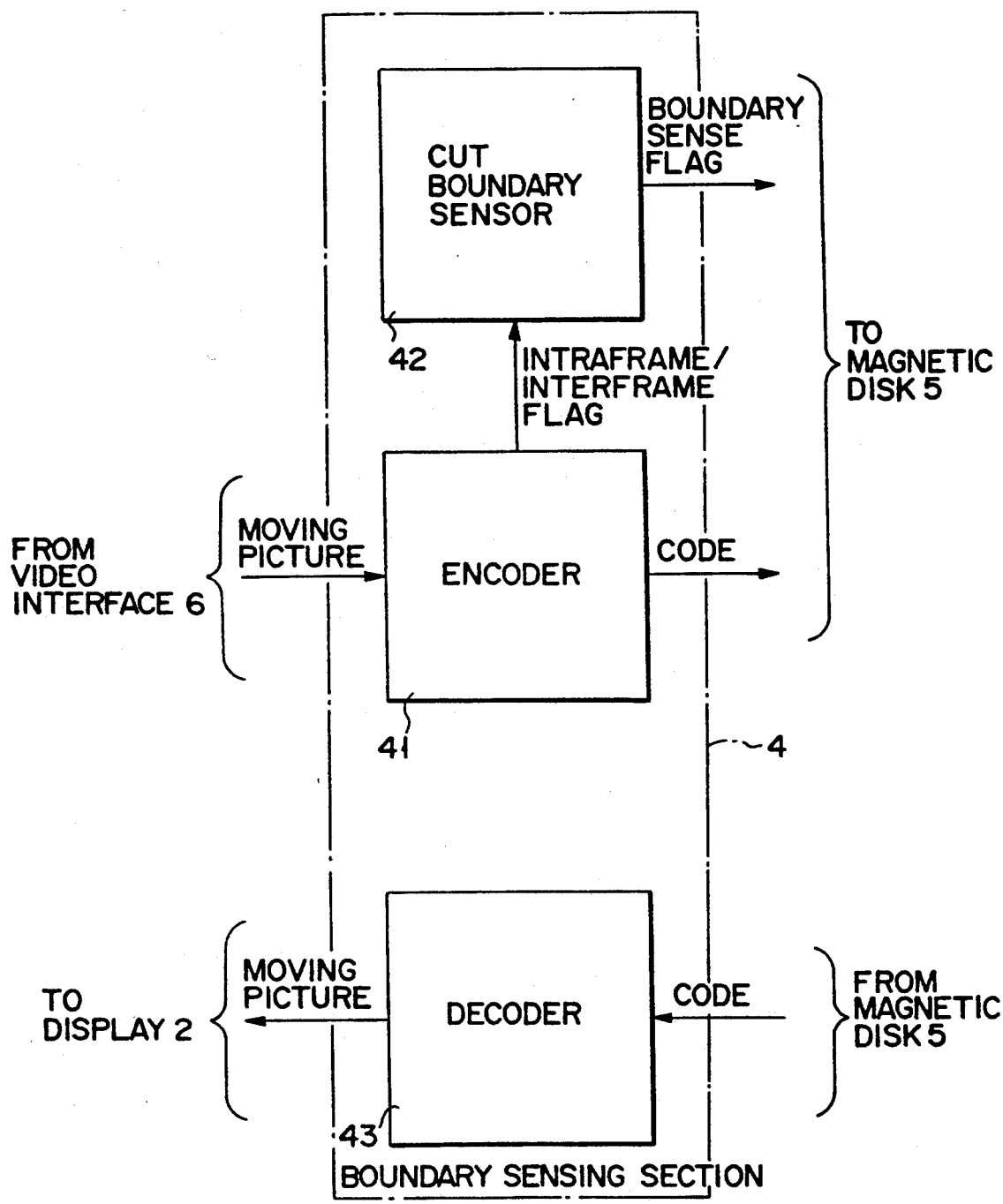
F I G. 3

| |
|---|
| NAME OF MOVING PICTURE |
| SCENE NUMBER |
| 1 CUT NUMBER |
| CUT LENGTH (IN SECONDS) |
| REPRESENTATIVE FRAME |
| ENCODED MOVING PICTURES |
| ADDRESS OF PARENT CUT |
| ADDRESS 1 OF DAUGHTER CUT |
| 2<br>3<br>: |

F I G. 10

MOVING PICTURE MANAGING DEVICE

BACKGROUND OF THE INVENTION

1. Field of the Invention

This invention relates to a moving picture managing device capable of performing the electronic input, display, storage, editing, and retrieval of moving pictures.

2. Description of the Related Art

With the recent spread of VTRs and video movies, moving pictures have been one of the most popular media. As more and more moving pictures are recorded to storage media such as videocassettes, it is increasingly difficult to manage them. At present, there is no choice but to inefficiently retrieve stored moving pictures using the label of each cassette.

Since videocassettes are basically sequential access media, to locate a desired scene in a videocassette for retrieval or editing, it is necessary to repeatedly fast-forward and rewind the tape while watching the tape counter until the desired portion is reached.

Therefore, it is difficult not only to find the necessary scene or cut, but also to edit tape in scenes or cuts. Furthermore, cut-by-cut filing is too heavy a burden for the user.

SUMMARY OF THE INVENTION

It is, accordingly, an object of the present invention to overcome the disadvantages of difficulty in finding the necessary scene or cut and editing tape in scenes or cuts and of forcing the user to do unreasonably troublesome cut-by-cut filing, by providing a moving picture managing device that manages moving pictures by storing them in a tree structure fashion in which a moving picture is composed of scenes and cuts, assures not only easy retrieval of necessary scenes and cuts but also easy editing on a scene or cut basis, and even provides automatic cut-by-cut filing to ease the user's burden.

The foregoing object is accomplished by providing a moving picture managing device comprising: input means for inputting a moving picture, the moving picture being arranged in a tree structure by a plurality of scenes and cuts, and each scene being coupled to a plurality of cuts belonging to the scene; sensing means for sensing the boundary between a cut of the input moving picture consisting of a plurality of frames and another cut according to the amount of change in the member of blocks at the time of encoding the moving picture for a frame between the frame and an adjacent frame; storage means for storing in cuts the moving pictures by said sensing means; output means connected to said storage means for supplying the moving picture in cuts read from said storage means; specifying means for specifying the partition between a scene made up of a plurality of cuts of the moving picture supplied from said output means and another scene; and processing means for, according to the specification by said specifying means, storing one moving picture in a tree structure fashion in which the moving picture is composed of one scene and a plurality of cuts.

With this arrangement, each cut boundary is sensed on the basis of the amount of change in the number of blocks at the time of encoding a moving picture for a frame between adjacent frames. Based on the sensed cut boundaries, the moving picture is divided into single-cut files, each cut consisting of a plurality of frames, and these single-cut files are stored in storage means. The stored single-cut files are read from the storage means for display. Seeing what is displayed on the screen, the operator is allowed to specify the partition of adjacent scenes, each consisting of a plurality of cuts. According to this invention, a moving picture is stored in the storage means in the form of a tree structure of scenes and cuts.

With this method, moving pictures can be managed by storing them in the form of a tree structure of scenes and cuts, which provides easy retrieval of necessary scenes and cuts as well as easy editing on a scene or cut basis. Additionally, cut-by-cut filing can be performed automatically, thereby easing a burden on the user.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic block diagram showing the construction of a moving picture managing device according to the present invention;

FIG. 2 shows a format of moving pictures to be processed by the moving picture managing device according to the present invention;

FIG. 3 is a block diagram for the cut boundary sensing section of FIG. 1;

FIG. 10 shows the structure of a single-cut file; and

DETAILED DESCRIPTION OF THE PREFERRED EMBODIMENTS

Figure 4:
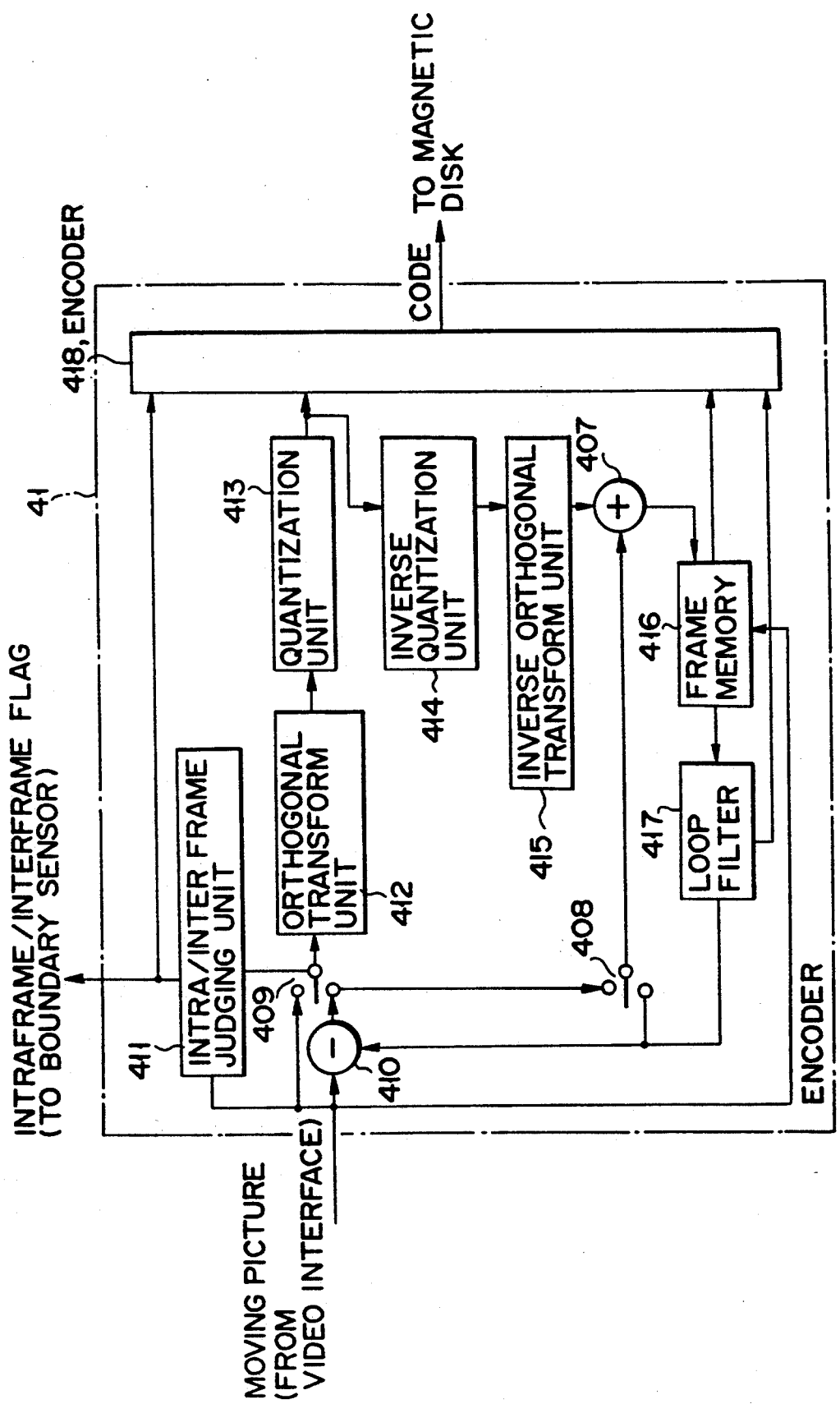
FIG. 4 is a block diagram for the encoder of FIG. 3.

An embodiment of the present invention will be described in detail, referring to the accompanying drawings. FIG. 1 is a block diagram for a moving picture managing device according to the present invention. The moving picture managing device is composed of: a CPU 1 for performing various controls; a CRT display device 2 for displaying moving pictures and information on moving picture management; a memory 3 for storing the control program for the CPU 1, pictures to be displayed on the CRT display device 2, and other information, a boundary sensing section 4 for receiving a series of moving pictures made up of a plurality of cuts and sensing cut boundaries; a magnetic disk device 11 for handling a magnetic disk (HD) 5 that stores a series of moving pictures or single-cut files consisting of a plurality of frames segmented at the boundary sensing section 4; a video interface 6 for receiving an NTSC (National Television System Committee) signal from a video camera 7, VTR 8, or the like and converting it into a format suitable for the present moving picture managing device; the video camera 7 or VRT 8 connected to the video interface 6; and a mouse (or a keyboard) 10 serving as input means.

Connected to a bus 9 are the CPU 1, memory 3, boundary sensing section 4, video interface 6, mouse 10, and magnetic disk device 11, of which the CPU 1 controls the other components.

In place of the magnetic disk 5, other types of storage medium may be used. For example, an optical disk (OD) or a remote file on a network may be used.

An example of a format of moving pictures used in the embodiment is shown in FIG. 2. A pixel is represented by density of 8 bits and chromaticity (I, Q) of 4 bits each and 640×512 pixels constitute a frame and 30 frames are processed in a second. The boundary sensing section 4 carries out operation in blocks that are obtained by dividing 640×512 pixels into blocks of 8×8 pixels.

The boundary sensing section 4, as shown in FIG. 3, is composed of: an encoder 41 for encoding the input picture through the intraframe comparison of sensing the presence or absence of movements by comparing a frame with the previous frame in blocks or the interframe comparison of sensing the presence or absence of movements by comparing the adjacent frames in terms of the number of blocks encoded, which causes smaller errors; a boundary sensor 42 for sensing the cut boundaries of consecutive frames by using the intraframe flag/interframe flag supplied from the encoder 41; and a decoder 43 for decoding the encoded moving pictures.

Moving picture information encoded at the encoder 41 is segmented into cuts at the boundaries sensed by the boundary sensor 42, and these cuts, with a cut as a file, are stored in the magnetic disk 5.

The decoder 43 decodes a file stored in the magnetic disk 5 when it is displayed.

The encoder 41, as shown in FIG. 4, is made up of an intraframe/interframe judging unit 411, an orthogonal transform unit 412, a quantization unit 413, an inverse quantization unit 414, an inverse orthogonal transform unit 415, a frame memory 416, a loop filter 417, an encoder 418, a subtracter 410, selector switches 408 and 409, and an adder 407.

The intraframe/interframe judging unit 411 predicts for a frame the amount of change in the moving picture motion between the input block and the block undergone motion compensation using a retrieved motion vector and, when the prediction error is large, continues the prediction between the input block and the block already present in the frame. When the prediction error is large, then the selector switches 409 and 408 will be switched to the upper position to deliver the picture of the input block as it is to the orthogonal transform unit 412 via the selector switch 409. When the prediction error is small, then the selector switches 409 and 408 will be changed to the lower position, so that the block or blocks of the immediately preceding picture from the loop filter 417 is or are subtracted from the input block of a moving picture at the subtracter 410 and then the resulting picture is supplied to the orthogonal transform unit 412.

The orthogonal transform unit 412 performs a two-dimensional orthogonal transform (DCT) on the picture supplied from the selector switch 409. The quantization unit 413 quantizes the result of orthogonal transform at the orthogonal transform unit 412. The inverse quantization unit 414 carries out the inverse quantization in order to perform the motion compensation of the coefficient of 8×8 pixels after quantization by the quantization unit 413. The inverse orthogonal transform unit 415 decodes the data from the inverse quantization unit 414 by inverse orthogonal transform. The frame memory 416 stores the added picture (the immediately preceding picture) from the adder 407, the picture being obtained by adding the decoded data from the inverse orthogonal transform unit 415 to the picture supplied via the loop filter 417 and selector switch 408 from the frame memory 416 at the adder 407.

The loop filter 417 is used to reduce quantization errors. The encoder 418 supplies codes according to the block specification by the intraframe/interframe judging unit 411, the quantization index for conversion coefficient and the instruction from the quantization unit 413, the motion vector from the frame memory 416, and the loop on/off instruction from the loop filter 417.

With this configuration, the intraframe/interframe judging unit 411 predicts for a frame the amount of change in the moving picture motion between the input block and the intraframe block undergone motion compensation using a retrieved motion vector. When the prediction error is large, the selector switches 409 and 408 will be switched to the upper position, whereas when it is small, they will be switched to the lower position. Therefore, with a large prediction error, the picture of the input block is supplied as it is via the selector switch 409 to the orthogonal transform unit 412, which performs a two-dimensional orthogonal transform (DCT). Then, the orthogonally transformed data is quantized at the quantization unit 413 and is supplied to the encoder 418.

The quantized data from the quantization unit 413 is decoded at the inverse quantization unit 414 and inverse orthogonal transform unit 415 and then is supplied to the adder 407. The adder 407 adds the decoded picture from the inverse orthogonal transform unit 415 to the immediately preceding picture from the frame memory 416 and the resulting picture updates the contents of the frame memory 416. The encoder 418 supplies codes according to the specification of blocks in the intraframe/interframe by the intraframe/interframe judging unit 411, the quantization index for conversion coefficient and the instruction from the quantization unit 413, the motion vector from the frame memory 416, and the loop filter on/off instruction from the loop filter 417.

The way of dividing a moving picture composed of a series of frames into cuts will now be explained.

Since there is a great similarity between continuous frames within a cut, interframe encoding has smaller prediction errors, requiring a smaller number of blocks to undergo intraframe encoding. Conversely, a correlation between the last frame of a cut and the first frame of the next cut is much less strong, so that intraframe encoding is more preferable, which locally increases the number of blocks undergoing intraframe encoding. In this way, a series of moving pictures is segmented into individual cuts.

Figure 5:
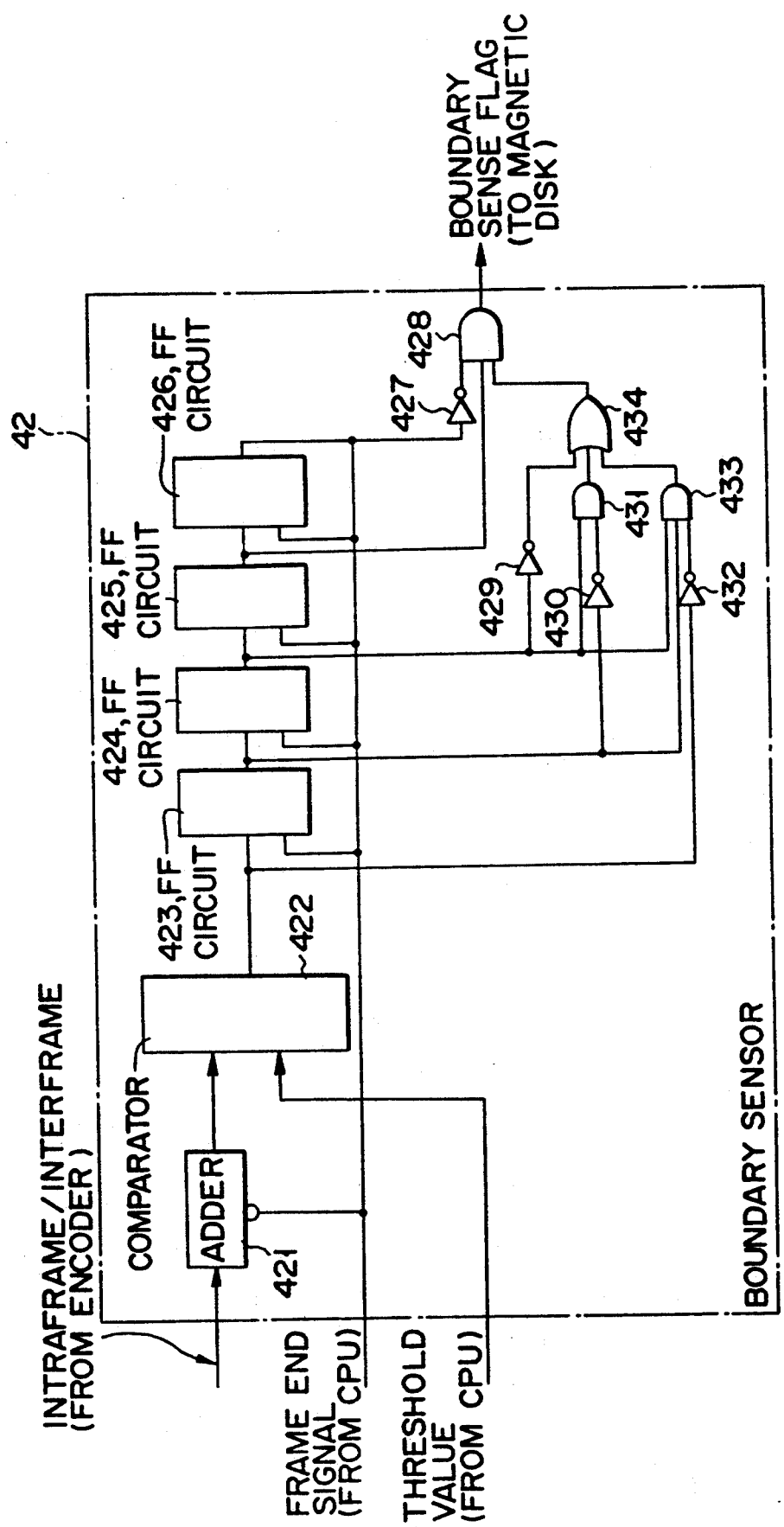
FIG. 5 is a block diagram for the boundary sensor of FIG. 3.

The boundary sensor 42, as shown in FIG. 5, is made up of an adder 421, a comparator 422, FF circuits 423 through 426, and logic gates 427 through 434. The adder 421, which is initialized to zero by the frame end signal (or the frame start signal) from the CPU 1, checks each block to see if the flag from the encoder 41 is that of intraframe or interframe, and increases by 1 when it is an intraframe flag, while remaining unchanged when it is an interframe flag. The comparator 422 compares the number of blocks encoded for a frame with the threshold value previously given by the CPU 1 and when the number of blocks is larger, supplies a flag indicating that there was a change (or a presence-of-change flag).

The FF circuits 423 through 426, which constitute a four-stage circuit and latch the presence-of-change flag from the comparator 422 with the timing of the frame end signal from the CPU 1, hold information on the presence or absence of changes in the last four frames. The logic gates 427 through 434 make up a logic circuit that determines that a cut boundary is sensed when the flags indicating the presence or absence of changes in five consecutive frames are in the order of <absence, presence, absence, *, * (* may be either presence or absence)> or <absence, presence, presence, absence, *> or <absence, presence, presence, presence, absence>.

With this arrangement, the adder 421 is initialized to zero for each frame with the timing of the frame end signal from the CPU 1. When the flag sent from the encoder 41 for each block is that of an intraframe block, the adder 421 increases by 1 and supplies the result to the comparator 422. When the comparator 422 determines that the contents of addition from the adder 421, or the number of blocks encoded for a frame, is larger than the specified threshold value, it supplies a presence-of-change flag to the FF circuit 423.

The FF circuits 423 through 426, with the timing of the frame end signal form the CPU 1, latch the presence-of-change flag in sequence to hold information on the presence or absence of changes in the last four frames. When the contents of the latched data in the FF circuits 423 through 426 are one of <absence, presence, absence, *, *>, <absence, presence, presence, absence, *>, and <absence, presence, presence, presence, absence>, logical operation by the logic gates 427 through 434 determines that a cut boundary has been sensed and the logic gate 428 produces a boundary flag.

That is, this logic circuit determines the existence of a cut boundary when a presence of change continues over three consecutive three frames or less with the preceding and the following absence.

Figure 6:
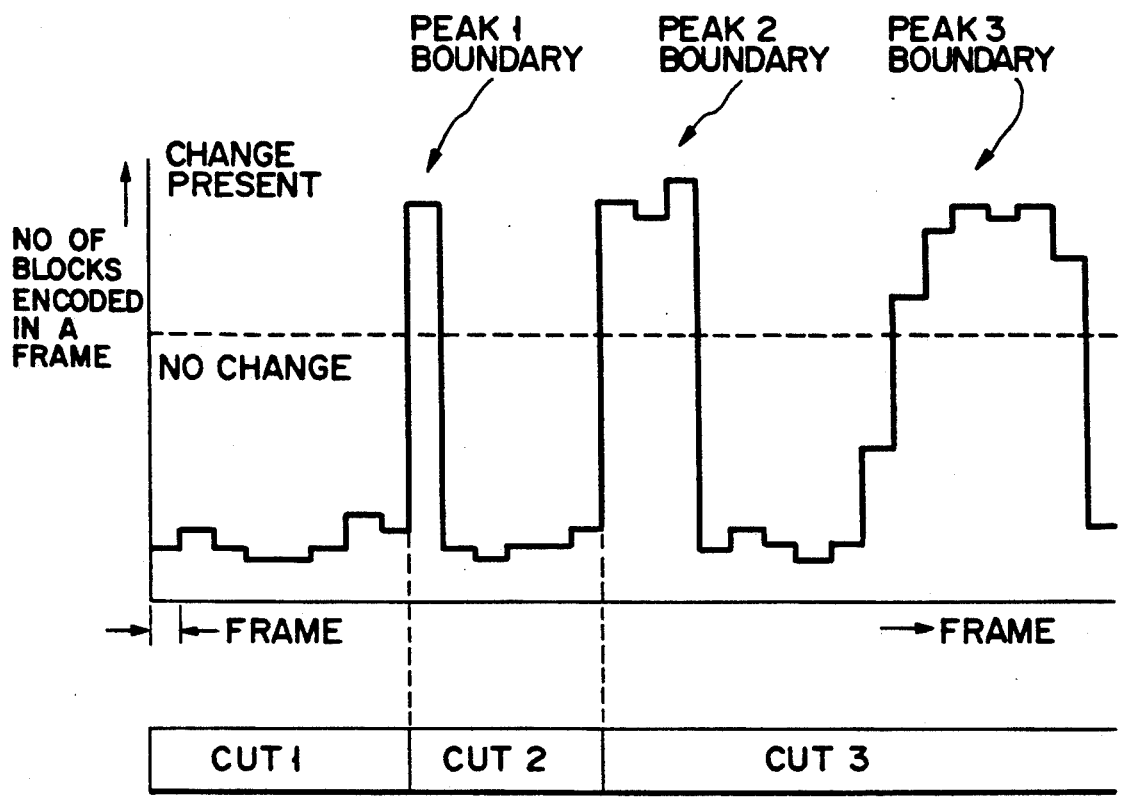
FIG. 6 is an explanatory view for the operation of the boundary sensor of FIG. 3.

An example of judgment is shown in FIG. 6. The number of frames are indicated on the abscissa axis and number of blocks encoded for each frame on the ordinate axis. It is assumed that the number of blocks encoded has changed as shown in the figure. Because peak 1 has a portion higher than the threshold value for only one frame with the preceding and following frames remaining unchanged, the boundary sensor 42 of FIG. 5 judges that a boundary is sensed. As a result the first frame to the frame immediately before peak 1 are segmented as cut 1 and stored as a file. Similarly, peak 2 is also judged for a boundary, so that the frames from peak 1 to just before peak 2 are segmented as cut 2. On the other hand, peak 3 has more than three consecutive frames with the presence of change, so that it is not judged to be a boundary.

In this way, an object moving in front of the lens of the video camera 7 or a sudden, large movement of the video camera is not erroneously judged to be a cut boundary, which provides good segmentation.

In the embodiment, a portion where an absence of change lasts for one or more frames, a presence of change for three or less consecutive frames, and an absence of change for one or more frames in that order is judged to be the boundary of peak 1. By modifying the FF circuit and logic gates of FIG. 5, it is also possible to make the same judgment when an absence of change lasts for Tf or more consecutive frames, a presence of change for Tw or more consecutive frames, and an absence of change for Ta or more consecutive frames in that order.

Because the decoder 43 has the same construction as that of the encoder 41, the encoder 41 may be constructed so as to act as both encoder and decoder, in which case the decoder 43 is unnecessary.

Figure 7:
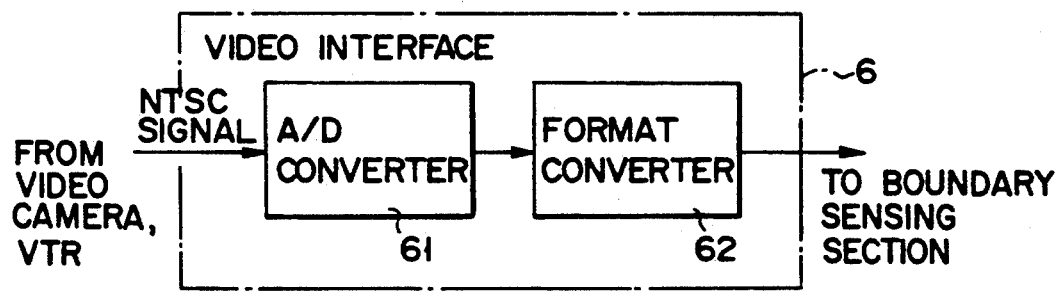
FIG. 7 is a block diagram for the video interface of FIG. 1.

The video interface 6, as shown in FIG. 7, is composed of an A/D converter 61 and a format converter 62. The A/D converter 61 converts an NTSC signal from the video camera 7, VTR 8, or the like into a digital signal. The format converter 62 converts the digitized NTSC signal from the A/D converter 61 into the format shown in FIG. 2.

The input signal may be of another type such as the high definition television type instead of the NTSC type. In this case, the format should be converted so as to be compatible with the resolution of the type used. Alternatively, the input signal may be converted into the format of the present embodiment beforehand at another system and supplied via a network or in the form of FD (floppy disk).

The operation of the device thus constructed will now be explained. First, the entry of data from the video cassette in the video camera 7 or VTR 8 into the magnetic disk 5 is specified at the mouse 10 or keyboard. Frames of moving pictures are then supplied from the video camera 7 or VTR 8 via the video interface 6 and bus 9 to the boundary sensing section 4. The boundary sensing section 4 encodes the received moving pictures and at the same time, senses cut boundaries. After this processing, a cut consisting of a plurality of frames is stored as a file on a magnetic disk 5 in the magnetic disk device 11. In this case, as shown in FIG. 10, the magnetic disk 5 stores the name of a moving picture, cut number, cut length (in seconds), and moving-picture information consisting of a cut of encoded frames, the cut number being given serially in the cutting order.

The operator specifies the reading of the picture entered in the magnetic disk 5 from the mouse 10 or keyboard. Then, the CPU 1 sequentially reads out only the first frame of each cut, under the corresponding name of a moving picture, and displays them on the CRT display device 2. Seeing what is displayed on the screen, the operator judges whether each cut has the proper end and specifies the end for a scene (a series of consecutive cuts united in terms of meaning and time). The CPU 1 assigns the scene number to each cut on the magnetic disk 5 and at the same time, replaces the cut numbers with the serial numbers of scenes. When the operator judges that the cuts have the wrong ends, the CPU 1 is caused to enter the preceding and following cuts on the magnetic disk 5 as one cut.

Figure 8:
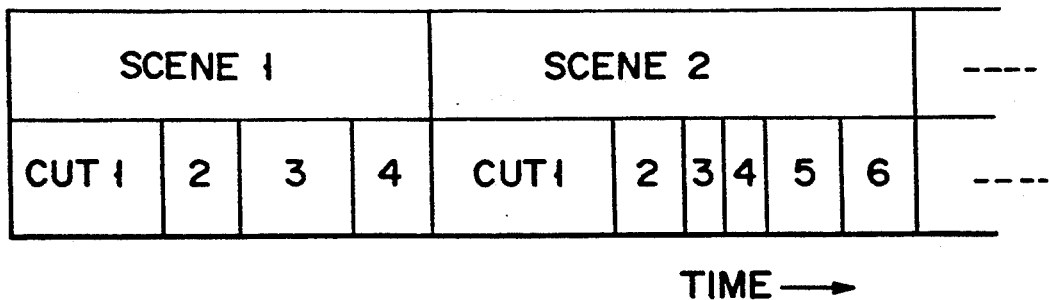
FIG. 8 illustrates how a moving picture is formed with respect to time.
Figure 9:
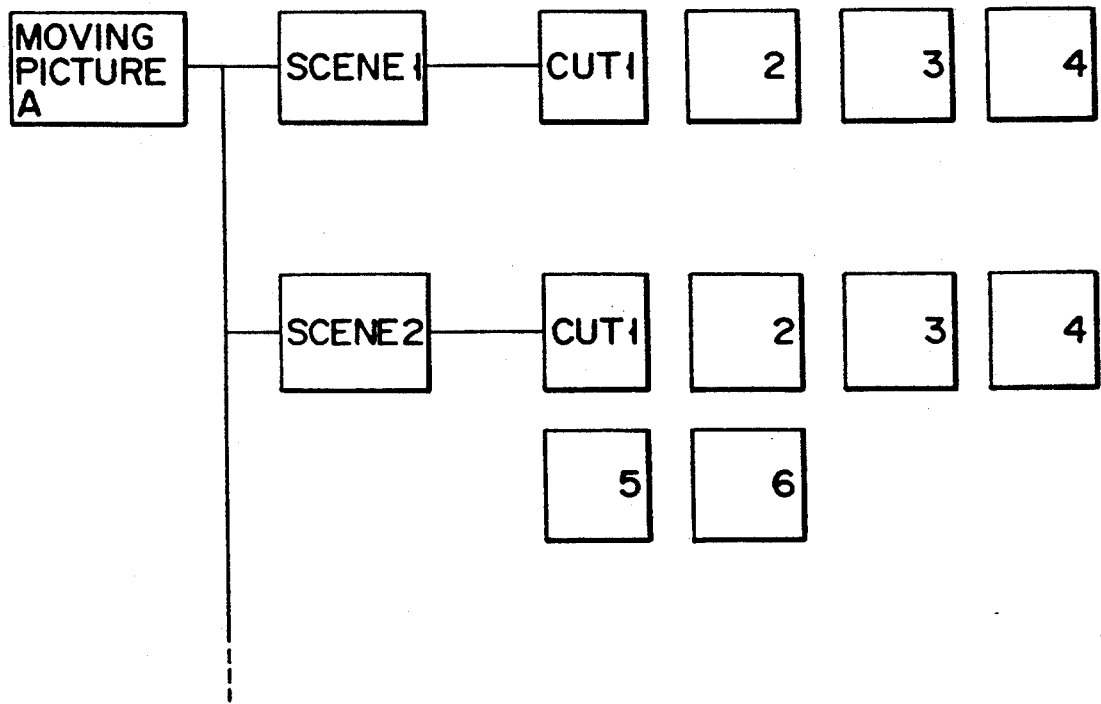
FIG. 9 is a tree structure diagram of the scenes and cuts constituting a moving picture.

Therefore, on the magnetic disk 5, the individual scenes and cuts for a series of moving pictures are constructed as shown in FIGS. 8 and 9, and are entered in the form of a tree structure in which a plurality of scenes, each consisting of a plurality of cuts, constitute a series of moving pictures.

As shown in FIG. 10, the parent cut, the daughter cuts, and the addresses of the parent cut and daughter cuts specified by the operator from the mouse 10 or keyboard are entered for each cut in the single-cut memory area of the magnetic disk 5.

In the single-cut memory area of the magnetic disk 5, the pictures of the first frame and an intermediate frame are entered as the moving picture encoded for a representative frame. The picture for the representative frame is used during fast-forward transport.

The CUP 1 may form a picture of a tree structure or a hierarchy structure (refer to FIG. 9) for a series of moving pictures and then enter it onto the magnetic disk 5, with the picture being associated with the cuts of the moving pictures.

Figure 11:
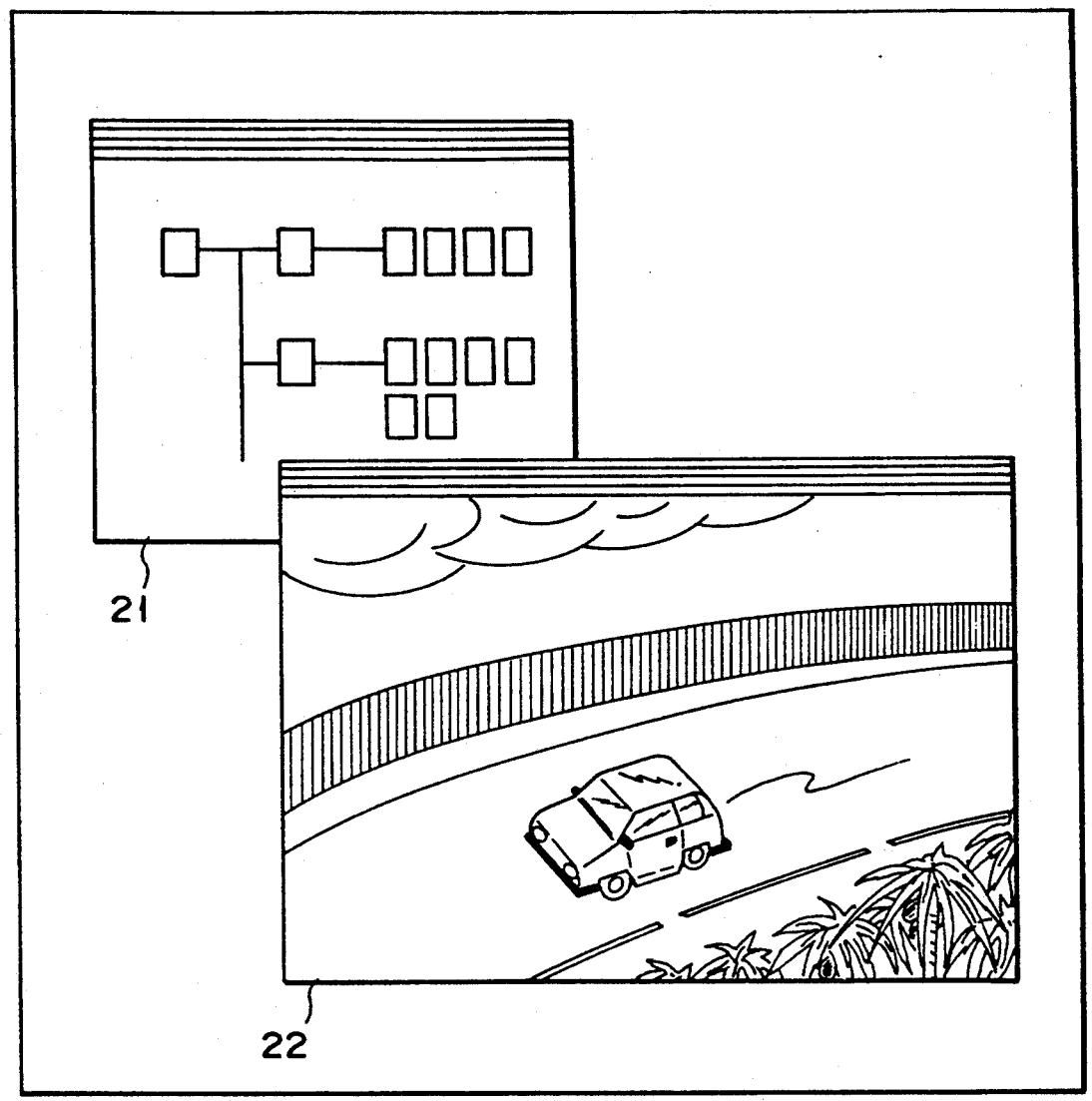
FIG. 11 depicts a picture on the display in the moving picture managing device according to the present invention.

When the operator specifies an operation such as picture editing and the name of moving picture from the mouse 10 and keyboard, then a picture representing the tree structure or hierarchy structure corresponding to the name of the moving picture will be read out of the magnetic disk 5 and, as shown in FIG. 11, will be displayed in the window 21 of the CRT display device 2. What is displayed in the window 21 is a structure where a moving picture is classified into scenes and cuts, each being indicated by a particular icon. In this situation, when the operator specifies the regeneration of a particular icon from the mouse 10 or keyboard, another window 22 will be opened and the scene or cut indicated by the icon will be read from the magnetic disk 5 and displayed in the window 22.

As noted above, the boundaries of cuts of the input moving picture are sensed on the basis of the amount of change between frames, and based on the sensed boundaries, the moving picture is divided into singlecut files, each consisting of a plurality of frames. Those single-cut files are stored in the magnetic disk. The picture for each stored single-cut file is read out of the magnetic file for display. Seeing the displayed picture, the operator specifies the end of a scene consisting of cuts from the mouse or keyboard. According to this specification, one moving picture is stored in the magnetic disk in the form of a hierarchy structure of scenes and cuts.

In this way, it is possible to manage moving pictures by storing each moving picture in the magnetic disk in the form of a hierarchy structure of scenes and cuts, and easily find the necessary scenes and cuts. In addition, a moving picture can be easily edited in scenes or cuts and even automatically segmented in cuts, which alleviates the user's burden.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A moving picture managing device comprising:
   input means for inputting a moving picture, said moving picture comprising a plurality of scenes, each scene comprising a plurality of cuts, each cut comprising a plurality of frames, and each frame comprising a plurality of blocks, each of said frames having a code associated therewith;
   means for detecting an amount of change in said moving picture by comparing information representative of differences between corresponding blocks in consecutive frames with a reference amount and for outputting a first determination signal when said amount of change is larger than said reference amount and a second determination signal when said amount of change is smaller than said reference amount;
   encoding means for encoding information representing a frame responsive to said first determination signal to produce first encoded information and for encoding information based on consecutive frames in said plurality of frames responsive to said second determination signal to produce second encoded information;
   means for determining boundaries between adjacent cuts in said plurality of cuts responsive to a sequence of said first and second determination signals; and
   storage means for storing said first and second encoded information and for storing said boundaries determined by said determining means.

2. A moving picture managing device according to claim 1, wherein:
   said detecting means comprises prediction means for predicting information in each block a frame responsive to previously input information, difference means for determining a difference between said predicted information and currently input information and comparison means for comparing the difference with said reference amount;
   said encoding means comprises orthogonal transforming means for performing an orthogonal transformation on said information representing a frame and for performing an orthogonal transformation on said information based on consecutive frames; and
   supply means for supplying said currently input picture information to said orthogonal transforming means responsive to said first determination signal and for supplying said difference to said orthogonal transforming means responsive to said second determination signal.

3. A moving picture managing device according to claim 1, further comprising dividing means for dividing said moving picture input by said input means into a plurality of blocks for subsequent processing.

4. A moving picture managing device according to claim 1, wherein:
   said detecting means compares an amount of change between corresponding blocks in consecutive frames and outputs a third determination signal when said amount of change between corresponding blocks is larger than a predetermined amount; and
   said determining means comprises counting means for counting a number of outputs of said third determination signal in comparison of a frame by said detecting means and comparison means for comparing the counted number of outputs with a predetermined value; wherein
   said boundaries are detected responsive to the result of said comparison.

5. A moving picture managing device according to claim 1, wherein:
   said determining means comprises means for determining a boundary between cuts when said amount of change in each of at least one but not more than three consecutive frames in said moving picture is above said predetermined value.

6. A moving picture managing method comprising the steps of:

inputting a moving picture, said moving picture comprising a plurality of scenes, each of said scenes comprising a plurality of cuts, each of said cuts comprising a plurality of frames, and each of said frames comprising a plurality of blocks and having a code associated therewith;

determining information representative of differences between corresponding blocks in consecutive frames;

comparing said information with a reference amount;

outputting a first determination signal when said amount of change is larger than said reference amount and a second determination signal when said amount of change is smaller than said reference amount;

encoding information representing a frame responsive to said first determination signal to produce first encoded information and information based on consecutive frames responsive to said second determination signal to produce second encoded information;

locating boundaries between adjacent cuts in said plurality of cuts responsive to a sequence of said first and second determination signals; and storing said first and second encoded information and said boundaries detected in said determining step.

7. A moving picture managing method according to claim 6, wherein:

said determining step comprises the steps of predicting information in each block a frame responsive to previously input information and detecting a difference between said predicted information and currently input information; and said encoding step comprises the step of performing an orthogonal transformation on said information representing a frame responsive to said first determination signal and on said information based on consecutive frames responsive to said second determination signal.

8. A moving picture managing method according to claim 6, said inputting step comprising the step of dividing said moving picture into a plurality of blocks.

9. A moving picture managing method according to claim 6, wherein:

said determining step comprises the steps of detecting an amount of change between corresponding blocks in consecutive frames and outputting a third determination signal when said amount of change between corresponding blocks is larger than a predetermined amount, counting a number of outputs of said third determination signal and comparing the counted number of outputs with a predetermined value; and said boundaries are detected responsive to the result of said predetermined value comparing step.

10. A moving picture managing device according to claim 6, wherein:

said locating step comprises the step of defining a boundary between cuts when said amount of change in each of at least one but not more than three consecutive frames in said moving picture is above said predetermined value.

* * * * *